FIG. 2

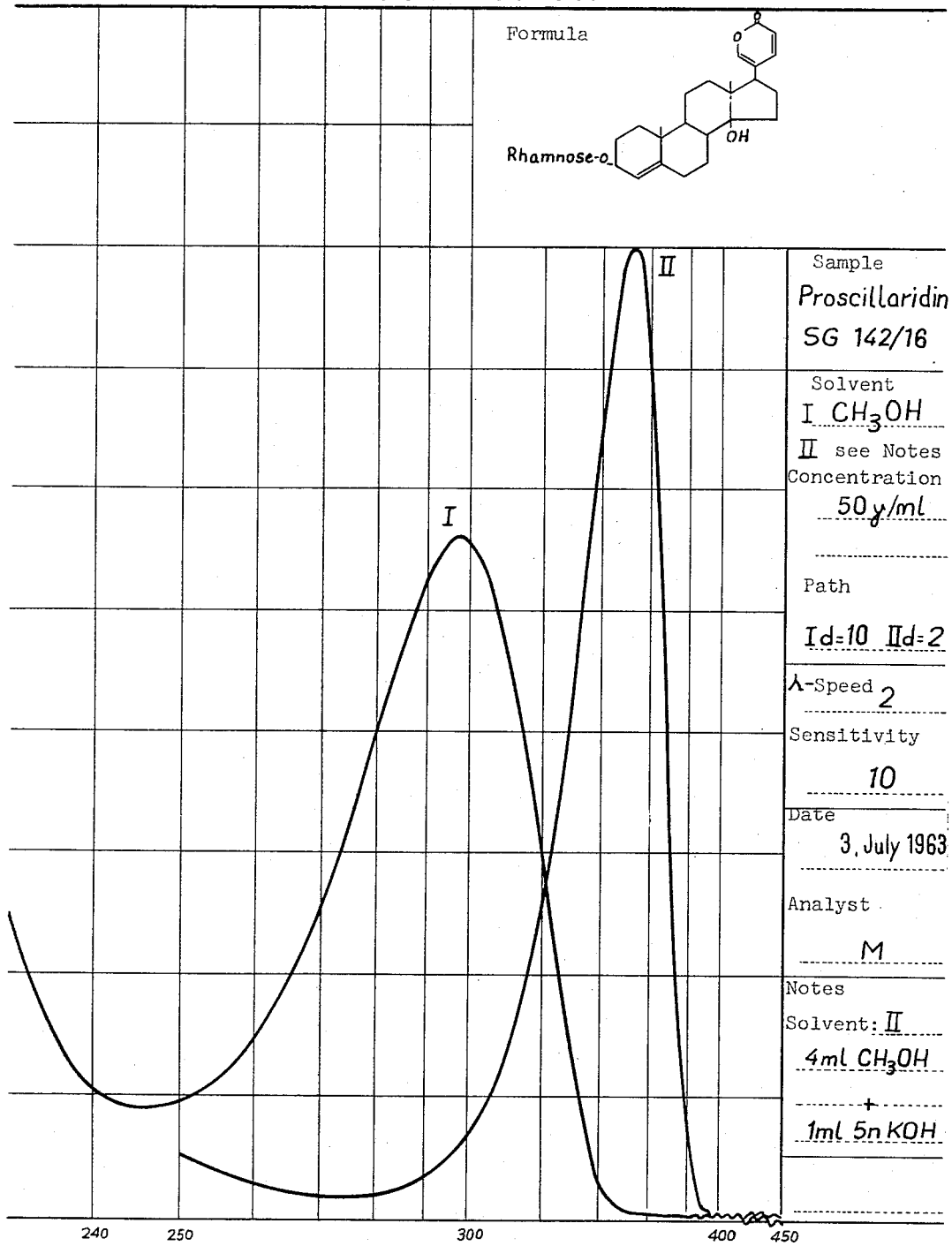

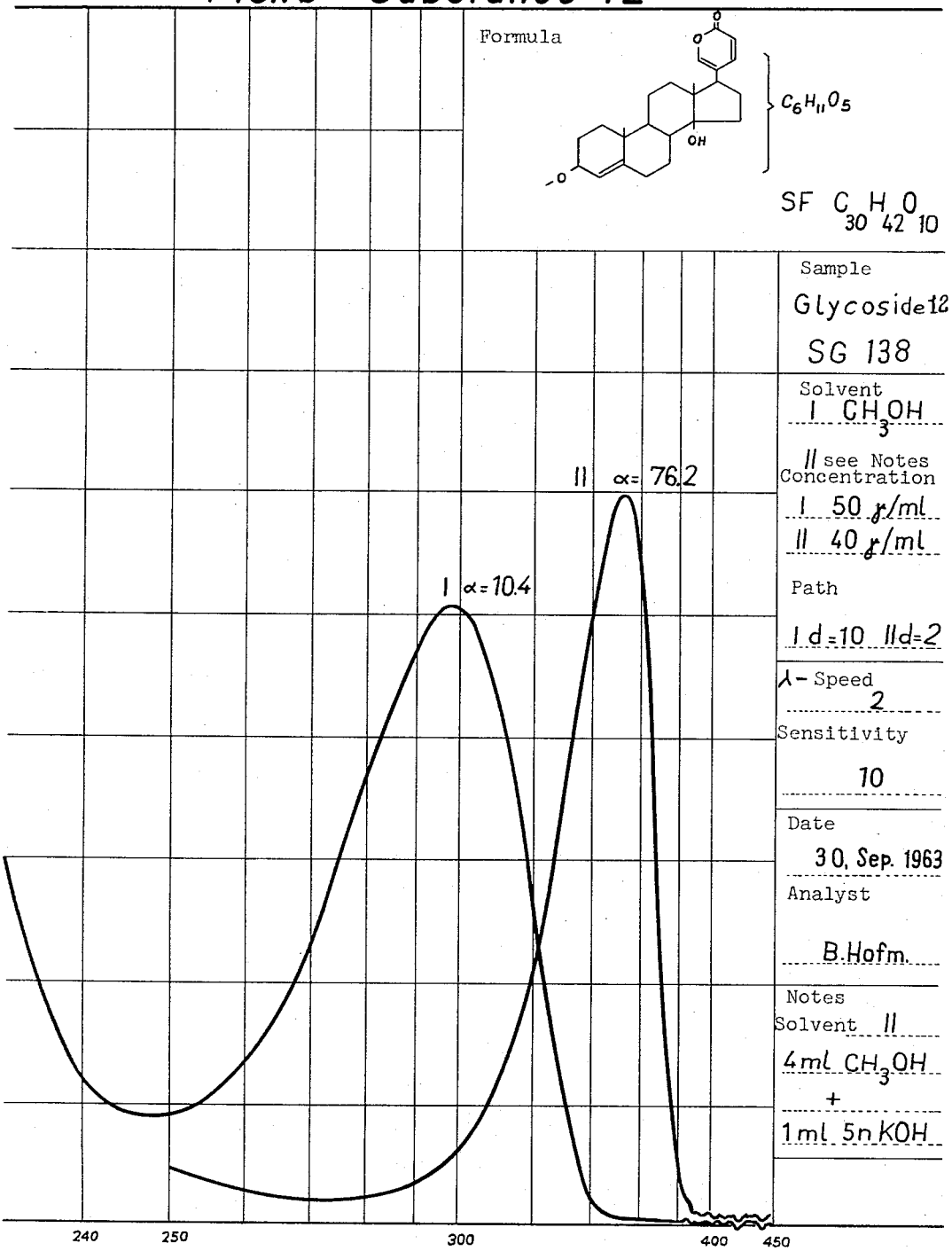

Thin layer chromatogram of proscillaridin and "substance 12".

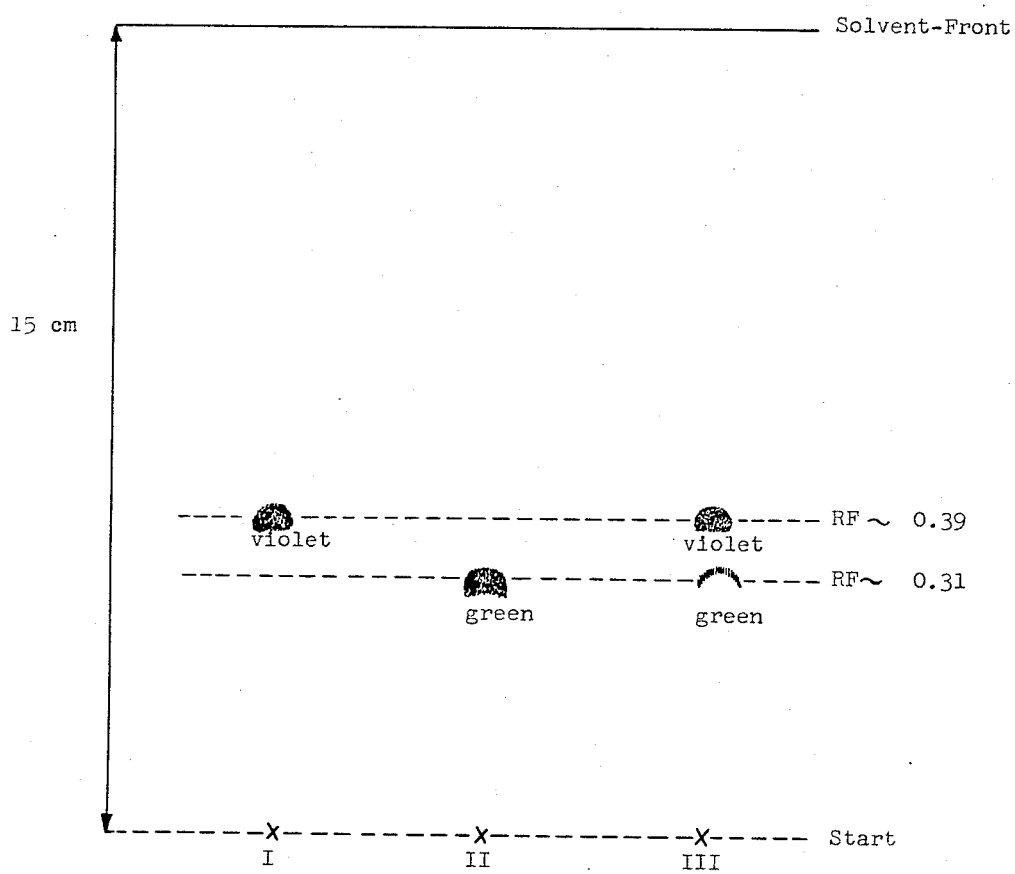

| | | | |
|---|---|---|---|
| I | = 100 | Proscillaridin | (in 0.1 ml) |
| II | = 100 | "Substance 12" | (in 0.1 ml) |
| III | = 95 | Proscillaridin - 5  "Substance 12" | (in 0.1 ml) |

Sorbent: Silicagel G (Merck, Germany) (plate 20 x 20 cm)

Eluent: Ethylacetate saturated with water

Technique: Twice ascending chromatographed (15 cm length of run each) with saturation of chamber Spray reagent: concentrated $H_2SO_4$ INVENTOR.
WALTER STEIDLE
BY
Curtis, Morris & Safford
ATTORNEYS

3,361,630
CARDIAC GLYCOSIDE
Walter Steidle, Limburgerhof, Germany, assignor to Knoll A.G., Ludwigshafen (Rhine), Germany
Filed Oct. 30, 1964, Ser. No. 408,469
Claims priority, application Germany, Nov. 2, 1963, K 51,257
7 Claims. (Cl. 167—65)

This invention relates to a specific cardioactive glycoside, $3\beta$-rhamnosido-$14\beta$-hydroxy-$\Delta^{4,20,22}$ bufatrienolide,

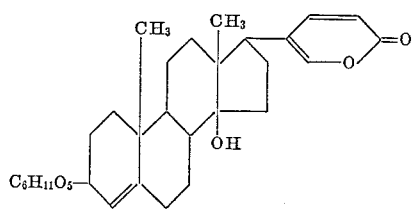

to a method for its preparation, to a method of treating cardiac insufficiencies therewith, and to a tablet for oral administration thereof. This glycoside is also referred to more simply as proscillaridin or proscillaridin A and is derived from the squill bulb, primarily the white squill *Scilla maritima* or *Urginea maritima*.

Squill has been known for several thousand years to have medicinal properties having beneficial activity on the heart. Determined efforts have been made to isolate and evaluate the cardiotonic properties of glycosides from squill as well as cardiac glycosides generally from such sources as the purple foxglove, *Digitalis purpurea*, the seeds of *Strophanthus kombé* and *Strophanthus courmonti*, the leaves and blossoms of lily of the valley, *Convallaria majalis*, the leaves of oleander, *Nerium oleander*, as well as many others. These efforts have been spurred on by the knowledge that cardiac glycosides have tremendous potential value because of the specificity of their action on the heart and particularly the heart muscle.

It has already been known that these and other sources of cardiac glycosides contain highly effective poisons. The foxglove was used for preparing a poison for the medieval trial by ordeal, the seeds of several African varieties of Strophanthus trees and shrubs yield arrow poison, every part of the oleander shrub is poisonous, and squill was and still is used as a most effective rat poison, having the unique and valuable property of causing rats having swallowed it to run off the premises in a frantic search for water before they succumb.

While the various cardiac glycosides have much in common, e.g., the specificity of their cardiac activity and their essentially poisonous nature, they differ widely in other properties. Squill glycosides heretofore suggested have been erratic in oral administration, the quantity absorbed varying from as little as 10% to as high as about 50% of the amount administered, and, therefore, provide little control over the progress of a given cardiac treatment. Digitoxin (from foxglove) is absorbed very efficiently whether administered orally or intravenously, whereas strophanthin, a strophanthidin glycoside, is relatively inactive when taken orally and is therefore usually administered by intravenous injection. The margin of safety between positive inotropic and fatally toxic doses is so minimal for most glycosides, however, that intravenous injection, with its almost immediate effectiveness, is to be avoided unless an emergency demands it, and then is to be administered only by someone having considerable experience with the drug and a knowledge of the amount thereof that may have been accumulated in the body. Some glycosides, such as digitoxin, tend to accumulate rapidly in the body because of slow elimination and are dangerous because an oral or intravenously administered dose, not toxic per se, when added to the amount previously accumulated, may increase the total amount sufficiently to cause death. Other glycosides, such as strophanthin, accumulate less rapidly due to faster elimination but are lacking because their parenteral absorption is too poor to make oral administration effective. Intravenous injection, aside from its objectionable feature per se, has the inherent disadvantage of resulting in such rapid absorption as to run the risk of supplying to the heart a momentary overdose if applied before most of the glycoside accumulated in the body is eliminated. In substance and by way of example, digitoxin treatment is dangerous, despite its efficient parenteral absorption, because of its rapid accumulation in the body. Strophanthin treatment is dangerous, despite its relatively rapid elimination from the body, because it must be injected intravenously to be effective and therefore offers a minimal margin of safety.

In efforts to chart a safer course between the extremes of digitoxin and strophanthin, the glycosides of the squill bulb have received considerable attention in the past forty years. These efforts have led to conclusions that the fleshy parts of the squill bulb contain a number of glycosides, primarily scillaren A. If a fresh cut squill bulb is left standing for a short period of time, a fermentative decomposition takes place by action of an enzyme, scillarenase, which splits one molecule of glucose off the scillarenin-L-rhamnose-D-glucose structure to produce a crude form of the scillarenin-L-rhamnose structure of proscillaridin. Heretofore, maximum effort was directed to rapid drying of the squill bulb, or rapid trituration thereof with inorganic salts, in order to inactivate or minimize the activity of scillarenase and thus obtain a maximum yield of scillaren A.

I have made the surprising discovery that proscillaridin, whose preparation as an undesired by-product has heretofore been avoided as much as possible, has, when purified in accordance with the procedure set forth herein, properties of positive inotropic action, enteral resorption, dissipation rate and acceptable low toxicity as to make it unexpectedly superior to the heretofore known glycosides in the treatment of cardiac insufficiencies, as shown below in Tables 1–6.

The proscillaridin of my invention is obtainable by disregarding prior admonitions to process the squill bulb rapidly to avoid fermentative decomposition. In accordance with this method, a squill bulb, whether fresh or dried, is cut into small pieces or macerated and allowed to ferment in water, preferably at a temperature between about 20 and 55° C. and for a time of about 2 to 24 hours, the time being shorter with higher temperatures within the range. The time of fermentation should not be so long, nor the temperature so high, as to allow any significant further degradation to the aglycone by splitting off of the rhamnose unit.

After fermentation, the crude proscillaridin that is thus formed is extracted from the aqueous suspension with a suitable inert organic solvent, subjected to chromatographic adsorption for separation of various impurities and finally obtained in pure crystallized form.

The extraction step for removing the crude proscillaridin resulting from fermentation may be carried out with any suitable solvent for proscillaridin that can be separated from the water of the aqueous suspension. Ethyl acetate, chloroform and butanol are particularly effective and are, therefore, preferred. Before subjecting the extract to chromatographic separation, it is desirable to evaporate the extract to dryness and then to redissolve the residue in an inert solvent such as dioxane. The chromatographic adsorption can be carried out with such adsorbent materials as silica gel and aluminum oxide. The proscillaridin thus adsorbed and separated is then eluated with a suitable eluant selectively to remove it from the adsorption material. This can be accomplished most effectively with toluene to which increasing proportions of a mixture of methanol and dioxane are added as the elution proceeds. Chloroform, methyl-ethyl ketone and mixtures thereof may, however, also be added. The eluant fraction is then preferably evaporated to dryness and the dried residue is recrystallized, preferably by use of methanol, ethanol, acetone, mixtures thereof or a mixture of one of these solvents with water.

The pure proscillaridin obtainable in accordance with the procedure described above has a melting point of 227–230° C., an optical rotation in methanol of −93.5° at 20° C., an absorption diagram as shown in FIGURE 1a and a thin layer chromatogram as shown in FIGURE 2 when compared with the undesired by-product, an intraduodenal $LD_{50}$ in cats of 0.273 mg./kg., an intravenous $LD_{50}$ in cats of 0.131 mg./kg., an enteral resorption coefficient of about 35% when determined by intravenous infusion after oral application (Table 5), an enteral resorption coefficient of about 50% when determined by means of intravenous and intraduodenal acute toxicity tests (Table 6) and a dissipation rate of about 50% in 24 hours.

If a comparison is drawn between the process for the recovery of proscillaridin as specified by Stoll et al.[1] and the process according to the invention, it is obvious that the new method needing only half as many steps in its working process is more simple by far and nevertheless it leads to a final product of higher purity. Moreover the yield of pure proscillaridin is higher than according to the process specified by Stoll because proscillaridin is being lost partially with the spoiled organic solvents ethylacetate and ether.

I have found that earlier forms of proscillaridin and scillaren A (scilla glycoside A) are accompanied by a heretofore unknown by-product (substance 12) which may amount to about 30% and more when using previous methods of preparation. As mentioned below in Tables 1–6, this by-product causes considerable deterioration of the therapeutical action of proscillaridin. As the by-product in its chemical structure is closely related to proscillaridin, its analytical detection caused considerable difficulties.

While usually the height of the melting point temperature sufficiently indicates the degree of purity of organic substances, I have found that it is not possible to analyse the purity of proscillaridin merely by determination of melting point temperatures. The purity of proscillaridin and the degree of separation of "substance 12" may be analyzed accurately only by combined evaluation of optical rotation, absorption diagram and thin layer chromatogram values, e.g., the data of an absorption diagram are nonspecific when considered alone. They are characteristic of but identical for all bufadienolides and they only show that "substance 12" is closely related to proscillaridin. However by means of thin layer chromatogram due to different migration speeds proscillaridin and "substance 12" may be identified separately, the degree of purity thus being evaluated.

Comparative tests with pure proscillaridin obtained according to the invention, scilla glycoside A, "substance 12" and g-strophanthin according to the method described by H.-G. Kurbjuweit[2] showed the following results:

TABLE 1.—LETHAL INTRAVENOUS DOSES IN GUINEA PIGS

| Glycoside | Lethal dose, mg./kg. | Infusion time, min. | Number of animals |
|---|---|---|---|
| Proscillaridin | 0.380±0.022 | 35 | 11 |
| Scilla glycoside A | 0.405±0.015 | 21 | 11 |
| "Substance 12" | 0.349±0.022 | 26 | 11 |
| g-Strophanthin | 0.290±0.013 | 38 | 10 |

TABLE 2.—LETHAL INTRAVENOUS DOSES IN CATS

| Glycoside | Lethal dose, mg./kg. | Infusion time, min. | Number of animals |
|---|---|---|---|
| Proscillaridin | 0.284±0.0116 | 35 | 10 |
| Scilla glycoside A | 0.200±0.0086 | 42 | 10 |
| "Substance 12" | 0.130±0.0078 | 32 | 11 |
| g-Strophanthin | 0.110±0.0036 | 61 | 11 |

Evaluation of cardiac activity under intravenous infusion of proscillaridin and scilla glycoside A in guinea pigs (Table 1) and cats (Table 2) clearly showed lower toxicity than under g-strophanthin and the associated glycoside. In cats, proscillaridin and scilla glycoside A have a 2.6 times and 1.8 times lower toxicity than g-strophanthin which more or less matches the associated glycoside.

TABLE 3.—POSITIVE INOTROPIC ACTION IN GUINEA PIG HEART-LUNG PREPARATION

| Substance | Prolongation of survival time to 100%, effected by μg (γ) | Maximum survival time in percent | Number of animals |
|---|---|---|---|
| Proscillaridin | 1.8 | 197 | 59 |
| Scilla glycoside A | 1.0 | 219 | 37 |
| "Substance 12" | 1.4 | 204 | 37 |
| g-Strophanthin | 3.6 | 176 | 66 |

The positive inotropic cardiac action was checked by means of the survival time of guinea pig heart-lung preparations. In this action, proscillaridin and scilla glycoside A were 2 and 3.6 times (respectively) more effective than g-strophanthin. The positive inotropic effects consequently do not run parallel with cardiac toxicity.

[1] A. Stoll, E. Suter, W. Kreis, B. B. Bussemaker, A. Hofmann, Helv. Chim. Acta, 16, 703–733 (1933).

[2] Arzneim.-Forsch. (Drug Res.) 14, 716–720 (1964).

TABLE 4.—NEGATIVE CHRONOTROPIC ACTION IN GUINEA PIG INFUSION

| Substance | Heart beat rate (min.) | | | Number of animals | Maximum bradycardic effect % |
|---|---|---|---|---|---|
| | Before infusion | During infusion | At the end of infusion | | |
| | | Lowest rate | Percent LD | | | |
| Proscillaridin | 290± 3.6 | 251±12.4 | 72 | 259 | 10 | 13 |
| Scilla glycoside A | 295±12.2 | 255± 8.2 | 62 | 255 | 9 | 13 |
| g-Strophanthin | 290±14.4 | 216±11.0 | 60 | 254 | 10 | 25 |
| Helveticoside | 276±13.4 | 243±12.9 | 67 | 257 | 12 | 12 |
| Digitoxin | 278±13.7 | 167±20.4 | 80 | 169 | 9 | 40 |

Infusion in guinea pigs revealed a low negative chronotropic action for proscillaridin and scilla glycoside A which nearly corresponds to that of helveticoside. Heart beat rate was decreased by 13%; with g-strophanthin and digitoxin the bradycardic effect was 25% and 40% respectively.

TABLE 5.—ENTERAL RESORPTION RATE IN CATS

| Substance | Time, h. | Subsequent g-Strophanthin infusion after oral application, mg./kg. | Number of animals | Resorption rate, percent |
|---|---|---|---|---|
| Proscillaridin | ½ | 0.065±0.00782 | 11 | 21 |
| Intravenous toxic dose 0.284, mg./kg. | 1 | 0.036±0.00991 | 11 | 34 |
|  | 2 | 0.038±0.01282 | 13 | 33 |
| Previous oral dose 0.568, mg./kg. | 3 | 0.045±0.01067 | 14 | 30 |
|  | 5 | 0.044±0.02832 | 5 | 30 |
| Scilla glycoside A | 1 | 0.073±0.00227 | 12 | 7 |
| Intravenous toxic dose 0.200 mg./kg. | 2 | 0.062±0.00738 | 12 | 9 |
| Previous oral dose 1.0 mg./kg. | 3 | 0.063±0.00865 | 12 | 9 |
|  | 5 | 0.049±0.00901 | 8 | 11 |

Using similar test methods W. Neumann [3] has found an enteral resorption rate of about 5% when checking g-strophanthin.

TABLE 6.—ACUTE INTRAVENOUS AND INTRADUODENAL TOXICITY OF PROSCILLARIDIN IN CATS

| Application | LD$_{50}$, mg./kg. | Number of animals | Determination time (hours after application) |
|---|---|---|---|
| Intravenous | 0.131 (0.125–0.138) | 60 | 24 |
|  | 0.127 (0.119–0.136) | 60 | 48 |
| Intraduodenal | 0.273 (0.210–0.355) | 60 | 24 |
|  | 0.268 (0.237–0.316) | 60 | 48 |

The enteral absorption rate was determined by intravenous infusion after oral application (Table 5) as well as by means of intravenous and intraduodenal acute toxicity tests (Table 6). When applying intravenous infusion the rate for proscillaridin was 34%; when applying toxicity tests it was 48%. The maximum value was reached as early as one hour after medication; as much as about ⅔ could be detected after ½ hour. Scilla glycoside A revealed a substantially lower absorption of 11%.

The relatively high cardiac toxicity of the associated glycoside—isolated here for the first time—suggests that a heretofore unknown by-product could be a factor in the toxicity of cardiac glycosides.

It will be apparent from the foregoing data that the proscillaridin of this invention has a significantly higher enteral resorption coefficient and lower toxicity than previously reported proscillaridin preparations and that these differences, further demonstrated by such indicia as higher optical rotation and different thin layer chromatogram, are responsible for the conclusion that the proscillaridin of the invention is eminently suitable for actual use in the treatment of cardiac insufficiency whereas earlier forms of proscillaridin or substances thought to be proscillaridin, have not been reported to be useful in oral therapy.

In addition, these data make it apparent that the proscillaridin of the invention possesses tremendous advantages over digitoxin and strophanthin, hitherto considered the most useful cardiac glycosides. Digitoxin is highly effective on oral administration because of its high enteral resorption coefficient (80–100%) but extremely dangerous because its very low dissipation rate (7% in 24 hours) permits rapid accumulation of the drug in the body to a fatally toxic amount. Strophanthin despite its more favourable (40% in 24 hours) dissipation rate, is practically useless for oral administration because of its extremely low (less than 10%) enteral resorption coefficient. In contrast, the combination of a practically ideal dissipation rate of 50%, insuring a readily controllable rate of accumulation, with an effective enteral resorption coefficient of about 35–50% makes the proscillaridin of the invention outstandingly superior to the others. It provides for fully effective and rapid positive inotropic action on oral administration that is safe, controllable and reliable with a minimum risk of overdosage due to accumulation in the body.

It has been found particularly desirable to treat cardiac insufficiency by oral administration of therapeutic dosage units in tablet, capsule or liquid form containing from about 0.25 to about 0.5 mg. proscillaridin, the remainder being a pharmaceutically acceptable, physically innocuous solid or liquid carrier material.

As solid carriers, which are suitable for the manufacture of useful pharmaceutical preparations, various inert pulverulent distributing agents as they are conventionally used in pharmaceutical compounding may be employed.

When preparing tablets, pills, powders, and the like the commonly used diluting agents, binders, lubricants, and the like are added, such as sugar, lactose, talcum, starch, pectins; as binders gelatin, gum arabic, methyl cellulose, yeast extract, agar, tragacanth; and as lubricating agents, magnesium stearate, stearic acid, and others.

As liquid carriers which are suitable for the manufacture of useful pharmaceutical preparations, there may be used well known solvents, diluents or solubilizers as glycerine, propylene glycol, polyethylene glycol, or other semipolar solvent. A pharmaceutically acceptable liquid preparation may be obtained by dissolving proscillaridin in 40 to 50% aqueous ethanol solution. Common taste improving agents may be added.

*Example*

350 g. of dried and cut squill were fermented at 50° C. for two hours in 1.1 liters of water. The suspension was then extracted three times with 1.1 liters of ethyl acetate. The extracts were united and evaporated to dryness, the residue was dissolved in 2 ml. of dioxane and chromatographed in a twenty-fold quantity (based on the amount of dried residue) of silica gel. The proscillaridin was then eluated with toluene to which increasing quantities of a methanol-dioxane-mixture were added. The main fraction, containing proscillaridin, was evaporated to dryness. The residue was crystallized out of methanol. Pure proscillaridin was obtained with a melting point of 227 to 230° C.; $\alpha_{20}^{D} = -93.5°$ C. (in methanol).

The same result was obtained by fermentation of the aqueous suspension of the cut squill at room-temperature for 24 hours and working up in the manner described.

I claim:
1. Proscillaridin of the formula

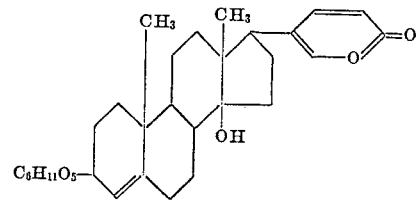

[3] Naunyn-Schmiedeberg's Arch. exp. Path. u. Pharmakol., 208, 87 (1949).

having a melting point of 227–230° C.; an optical rotation in methanol of =93.5° at 20° C., an absorption diagram as shown in FIGURE 1a and a thin layer chromatogram as shown in FIGURE 2 when compared with the undesired by-product, an intraduodenal $LD_{50}$ in cats of 0.273 mg./kg., an intravenous $LD_{50}$ in cats of 0.131 mg./kg., an enteral resorption coefficient of about 35% when determined by intravenous infusion after oral application (Table 5), an enteral resorption coefficient of about 50% when determined by means of intravenous and intraduodenal acute toxicity tests (Table 6) and a dissipation rate of about 50% in 24 hours prepared as defined in claim 2.

2. A method of preparing proscillaridin which comprises fermenting dried and cut squill in water at a temperature between about 20 and 55° C. for a period of about 2 to 24 hours, extracting the resulting crude proscillaridin from the aqueous suspension thus formed with an organic solvent selected from the group consisting of ethyl acetate, chloroform and butanol, evaporating the extract to dryness, dissolving the dried residue in an inert solvent, subjecting the dissolved residue to chromatographic adsorption, eluating the adsorbed proscillaridin, evaporating the eluant fraction to dryness, and recrystallizing it out of a member of the group consisting of methanol, ethanol, acetone, mixtures thereof or a mixture of one of these solvents with water.

3. A method as defined in claim 2 wherein the extraction medium is ethyl acetate.

4. A method as defined in claim 2 wherein the chromatographic adsorption is carried out with silica-gel as the adsorption material.

5. A method as defined in claim 2 wherein toluene with increasing proportions of a methanoldioxane mixture is used in the elution step.

6. A method of treating cardiac insufficiency which comprises oral administration of proscillaridin as characterized in claim 1.

7. An oral therapeutic dosage unit in tablet, capsule or liquid form containing from about 0.25 to about 0.5 mg. proscillaridin as characterized in claim 1.

References Cited

UNITED STATES PATENTS 2,069,687  2/1937  Stoll et al. ———— 260—210.5

FOREIGN PATENTS 105,482  2/1927  Austria.
140,397  1/1935  Austria.
646,930  6/1937  Germany.
255,689  7/1926  Great Britain.
405,890  2/1934  Great Britain.
166,354  3/1934  Switzerland.

OTHER REFERENCES

Gebhardt et al., Med. Klin. 59: 633–635, Apr. 10, 1964.
Gorlich, Arzneimittel—Forschung 10: 770–774, September 1960.
Hamer, Deutsches Medizinisches Journal 15: 397–398, May 20, 1964.
Kurbjuweit, Arzneimittel—Forschung 14 (6): 716–720 June 1964.
Rotter, Muenchener Medizinische Wochenschrift 100: 812–815, May 16, 1958.
Stahl et al., J. Chromatog 5: 458–460 (1961).
Steidle, Planta Med 9: 435–441 (1961).
Steidle, J. Leibig's Annalen de Chemie 662: 126–132 March 1963.
Steinegger et al., Pharm. Acta. Helv. 36: 599–601, November 1961.
Stoll et al., Helv. Chim. Acta 16: 703–733 (1933).
Stoll et al., Helv. Chim. Acta 34: 1431–1459 (1951).
Stoll et al., Helv. Chim. Acta 34: 1460–1477 (1951).
Stoll et al., Helv. Chim. Acta 35: 2495–2519 (1952).
Stoll, Experientia 10 (7): 282–297 July 15, 1954.
Straub, Therapie der Gegenwart 98 (5): 215–219, May 1959.
Telupilova-Krestynova et al., Ceskoslovenska Farmacie 6: 207–209 (1957).
Wichtl et al., Archiv der Pharmazie 295: 361–373 May 1962.

LEWIS GOTTS, *Primary Examiner.*

S. K. ROSE, *Assistant Examiner.*

UNITED STATES PATENT OFFICE
CERTIFICATE OF CORRECTION

Patent No. 3,361,630                               January 2, 1968

Walter Steidle

It is hereby certified that error appears in the above numbered patent requiring correction and that the said Letters Patent should read as corrected below.

Column 6, lines 33 to 35, the formula should appear as shown below instead of as in the patent:

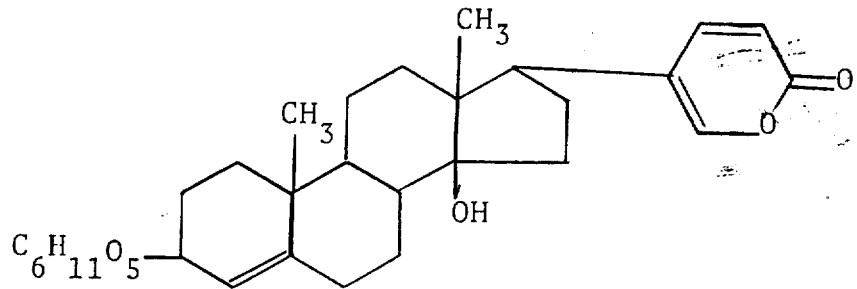

column 7, line 2, for "=93.5°" read -- -93.5° --.

Signed and sealed this 24th day of June 1969.

(SEAL)
Attest:

EDWARD M. FLETCHER, JR.
Attesting Officer

WILLIAM E. SCHUYLER, JR.
Commissioner of Patent